US010213764B2

(12) United States Patent
Schneider

(10) Patent No.: US 10,213,764 B2
(45) Date of Patent: Feb. 26, 2019

(54) NANOSTRUCTURED SAND, PROCESS FOR PRODUCING NANOSTRUCTURED SAND, PROCESS FOR SEPARATING A POLLUTANT-WATER MIXTURE WITH THE NANOSTRUCTURED SAND AND FURTHER USES

(71) Applicant: Ute Margitta Schneider, Berlin (DE)

(72) Inventor: Juergen Schneider, Berlin (DE)

(73) Assignee: UTE MARGITTA SCHNEIDER (DE)

( * ) Notice: Subject to any disclaimer, the term of this patent is extended or adjusted under 35 U.S.C. 154(b) by 246 days.

(21) Appl. No.: 15/121,740

(22) PCT Filed: Aug. 25, 2014

(86) PCT No.: PCT/EP2014/067995
§ 371 (c)(1),
(2) Date: Aug. 25, 2016

(87) PCT Pub. No.: WO2015/128010
PCT Pub. Date: Sep. 3, 2015

(65) Prior Publication Data
US 2017/0065961 A1 Mar. 9, 2017

(30) Foreign Application Priority Data

Feb. 25, 2014 (DE) .......... 10 2014 102 468
Mar. 14, 2014 (DE) .......... 10 2014 103 530

(51) Int. Cl.
*B01J 20/10* (2006.01)
*B01J 20/32* (2006.01)
(Continued)

(52) U.S. Cl.
CPC ....... *B01J 20/103* (2013.01); *B01J 20/28016* (2013.01); *B01J 20/3078* (2013.01); *B01J 20/3204* (2013.01); *B01J 20/3295* (2013.01); *B01J 20/3433* (2013.01); *C02F 1/281* (2013.01); *C02F 1/40* (2013.01); *C09K 3/32* (2013.01); *C01B 33/113* (2013.01);
(Continued)

(58) Field of Classification Search
None
See application file for complete search history.

(56) References Cited

U.S. PATENT DOCUMENTS 3,488,922 A    1/1970   Kirkland .......... 55/67
6,378,599 B1    4/2002   Schmidt et al. ........ 164/525
(Continued)

FOREIGN PATENT DOCUMENTS

CN    102942319    2/2013    ........ C04B 14/06
DE    1951222 A1    7/1970    ........ G01N 30/56
(Continued)

OTHER PUBLICATIONS

European Office Action (w/translation) issued in application No. 14 776 591.1, dated Sep. 4, 2017 (5 pgs).
(Continued)

*Primary Examiner* — Chester T Barry
(74) *Attorney, Agent, or Firm* — Hayes Soloway P.C.

(57) ABSTRACT

Provided is nanostructured sand, a process for producing same, a process for separating a pollutant-water mixture, and uses of the nanostructured sand.

11 Claims, 7 Drawing Sheets

Figure 1:
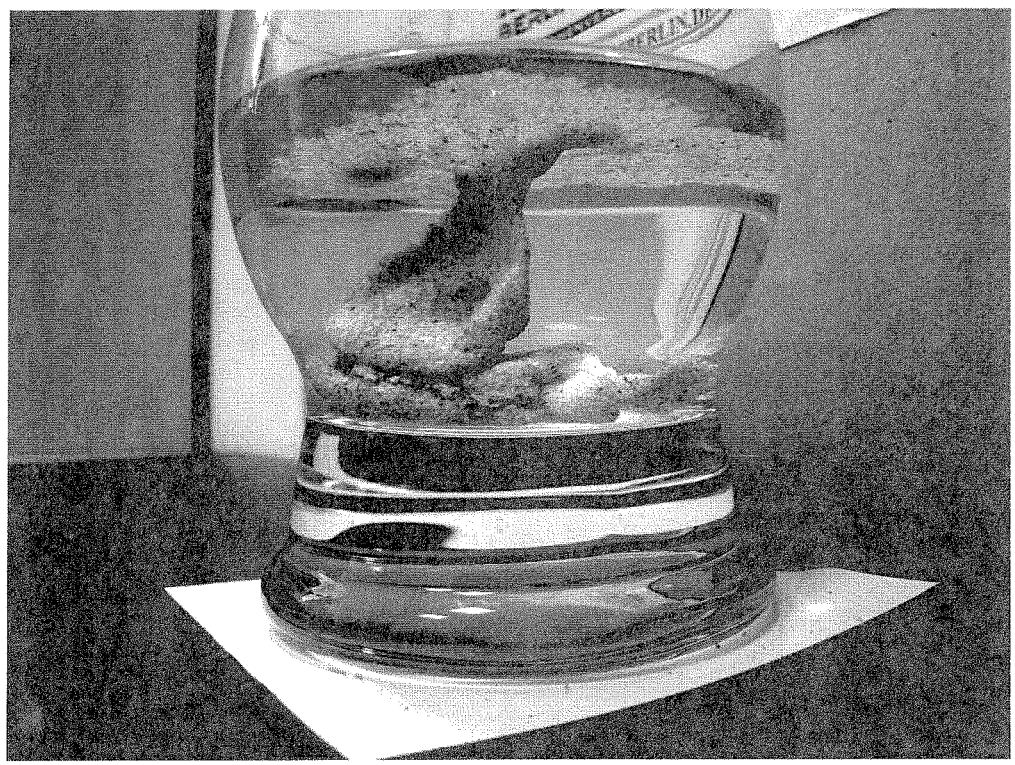

(51) Int. Cl.
*C02F 1/28* (2006.01)
*B01J 20/28* (2006.01)
*C02F 1/40* (2006.01)
*C09K 3/32* (2006.01)
*B01J 20/30* (2006.01)
*B01J 20/34* (2006.01)
*C02F 101/32* (2006.01)
*C02F 103/10* (2006.01)
*C02F 103/36* (2006.01)
*C01B 33/113* (2006.01)
*C02F 101/10* (2006.01)

(52) U.S. Cl.
CPC .. *C02F 2101/101* (2013.01); *C02F 2101/103* (2013.01); *C02F 2101/32* (2013.01); *C02F 2103/10* (2013.01); *C02F 2103/365* (2013.01); *C02F 2305/08* (2013.01)

(56) References Cited

U.S. PATENT DOCUMENTS

| | | | |
|---|---|---|---|
| 2007/0009809 A1 | 1/2007 | Krekeler et al. | 430/5 |
| 2007/0189944 A1* | 8/2007 | Kirkland | B01J 20/28004 423/118.1 |
| 2011/0217553 A1* | 9/2011 | Warner | B82Y 30/00 428/402.24 |
| 2012/0121858 A1* | 5/2012 | Kato | B05D 5/08 428/141 |
| 2014/0018600 A1* | 1/2014 | Pronovost | B01J 20/22 585/830 |
| 2014/0312281 A1* | 10/2014 | Jackson | H01L 51/0047 252/500 |

FOREIGN PATENT DOCUMENTS

| | | | |
|---|---|---|---|
| DE | 102009022516 | 12/2010 | B05D 5/00 |
| RU | 2489381 | 8/2013 | B82B 1/00 |
| WO | WO2009033476 | 3/2009 | C04B 20/02 |
| WO | WO2012109028 | 8/2012 | C04B 24/24 |

OTHER PUBLICATIONS

German Search Report (w/machine translation) issued in application No. 10 2014 102 468.0, dated Mar. 31, 2014 (5 pgs).
International Search Report (including translation) issued in application No. PCT/EP2014/067995, dated Jan. 27, 2015 (11 pgs).
Written Opinion of the International Searching Authority (including translation) issued in application No. PCT/EP2014/067995, dated Mar. 9, 2015 (20 pgs).
International Preliminary Report on Patentability (including translation) issued in application No. PCT/EP2014/067995, dated Aug. 30, 2016 (22 pgs).

* cited by examiner

NANOSTRUCTURED SAND, PROCESS FOR PRODUCING NANOSTRUCTURED SAND, PROCESS FOR SEPARATING A POLLUTANT-WATER MIXTURE WITH THE NANOSTRUCTURED SAND AND FURTHER USES

TECHNICAL FIELD

The present invention relates to nanostructured sand, a method of manufacturing the nanostructured sand, a method of separating a contaminant-water mixture and uses of the nanostructured sand.

PRIOR ART

When producing crude oil, the crude oil is mostly recovered as an oil-water mixture. If, during oil production, the inherent pressure of the deposit decreases (primary production), the feed pressure may be increased, in particular by pressing in water by means of suitable equipment (secondary production). In secondary production, water is used in an amount of about three times that of the produced oil. Thus, when producing about 26 million liters of oil per day, approx. 78 million liters of water per day will be required. For the oil to be further processed, it first has to be separated from the oil-water mixture. According to the methods used in the prior art, currently 7 to 10% of the oil remains in the water as a residue despite filtering. As currently this oil-water mixture cannot be further purified industrially, the contaminated water is fed into so-called lagoons to evaporate the water and subsequently, after several years, to recover and burn the solidified oil.

Consequently, the currently used method of separating the 7 to 10% oil residue is both ecologically and economically inefficient as i) the lagoons have to be built in the area around the oil production and thus may lead to environmental pollution, ii) the 7 to 10% oil residue cannot be used industrially and iii) the water used, due to evaporation, cannot be reused and, in particular, cannot be recycled for oil production.

The objects of the present invention consist in providing an improved method of separating the 7 to 10% oil residue obtained during oil production i) in which the risk of environmental pollution is reduced, ii) the oil yield is increased and/or iii) the water used can be reused, for example for producing oil.

SHORT SUMMARY OF THE INVENTION

The above objects are partially or completely resolved by the present invention. Advantageous embodiments are provided in the following description.

Consequently, a first embodiment of the present invention relates to a nanostructured sand comprising one or more sand grains, characterized in that at least part of the sand grains exhibits a surface that is at least partially structured with one or more silicon-based nanoparticles.

A second embodiment of the present invention relates to a method of manufacturing the nanostructured sand according to the present invention, characterized in that the method comprises the following steps or consists thereof:
a) providing sand comprising one or more sand grains,
b) providing one or more silicon-based nanoparticles in a carrier liquid,
c) mixing the sand from step a) with the one or more nanoparticles in the carrier liquid from step b) and then
d) heating the sand-nanoparticle-carrier liquid mixture from step c) until at least part of the sand from step a) exhibits a surface that is at least partially structured with the one or more silicon-based nanoparticles from step b).

A third embodiment of the present invention relates to a method of separating the contaminant-water mixture, characterized in that the method comprises the following steps or consists thereof:
a) providing a contaminant-water mixture,
b) providing nanostructured sand according to the present invention,
c) adding the nanostructured sand from step b) to the contaminant-water mixture from step a) until at least part of the contaminants is bound to the surface of the nanostructured sand,
d) separating at least part of the sand-contaminant composite formed in step c) from the water and,
e) if appropriate, at least partially separating the one or more contaminants from the sand-contaminant composite.

A fourth embodiment of the present invention relates to the use of a nanostructured sand according to the present invention
a) for separating the one or more different contaminants from a contaminant-water mixture,
b) as a water barrier layer in agriculture,
c) as a water barrier layer to prevent soil erosion,
d) as a water barrier layer when reclaiming land in coastal areas,
e) as a water barrier layer in the event of flooding,
f) as a barrier layer for water and/or contaminants in landfills,
g) as a water barrier layer in building construction,
h) as a water barrier layer in civil engineering, and/or
i) as brake sand for rail vehicles,
j) as a barrier layer for greases and/or oils, preferably crude oil.

If reasonable from the perspective of those skilled in the art, the above described embodiments of the present invention may contain any possible combination of the preferred embodiments of the present invention subsequently disclosed.

SHORT DESCRIPTION OF THE DRAWINGS

Figure 3:
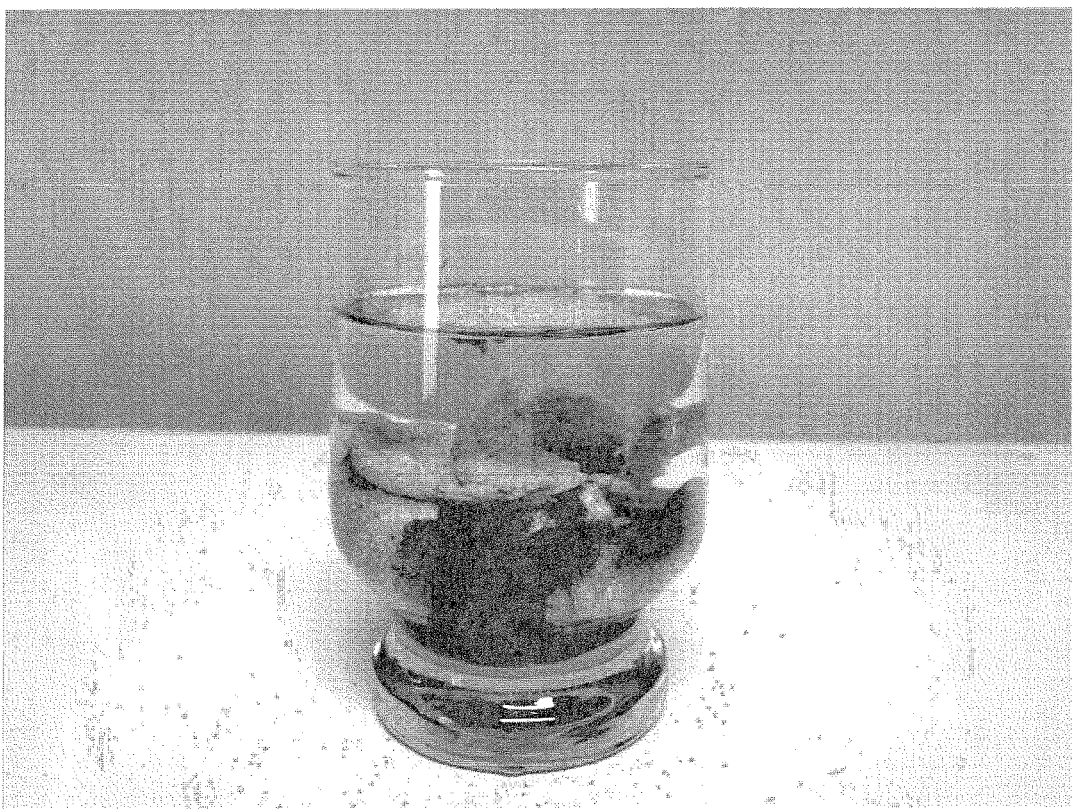
Figure 4:
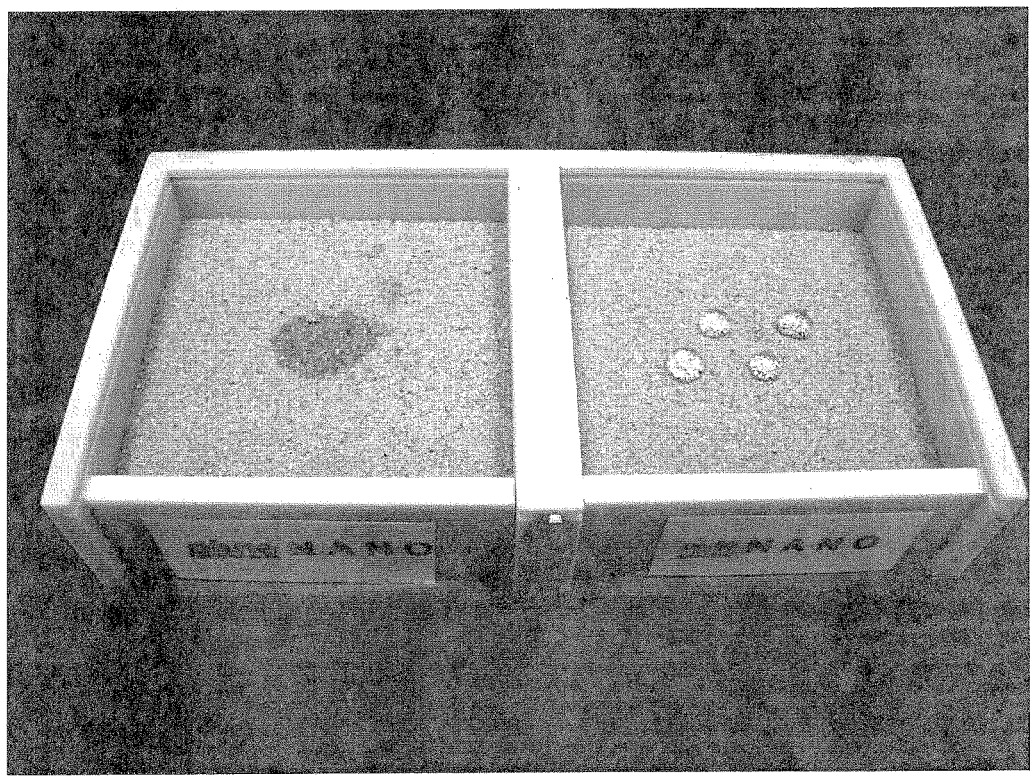
Figure 5A:
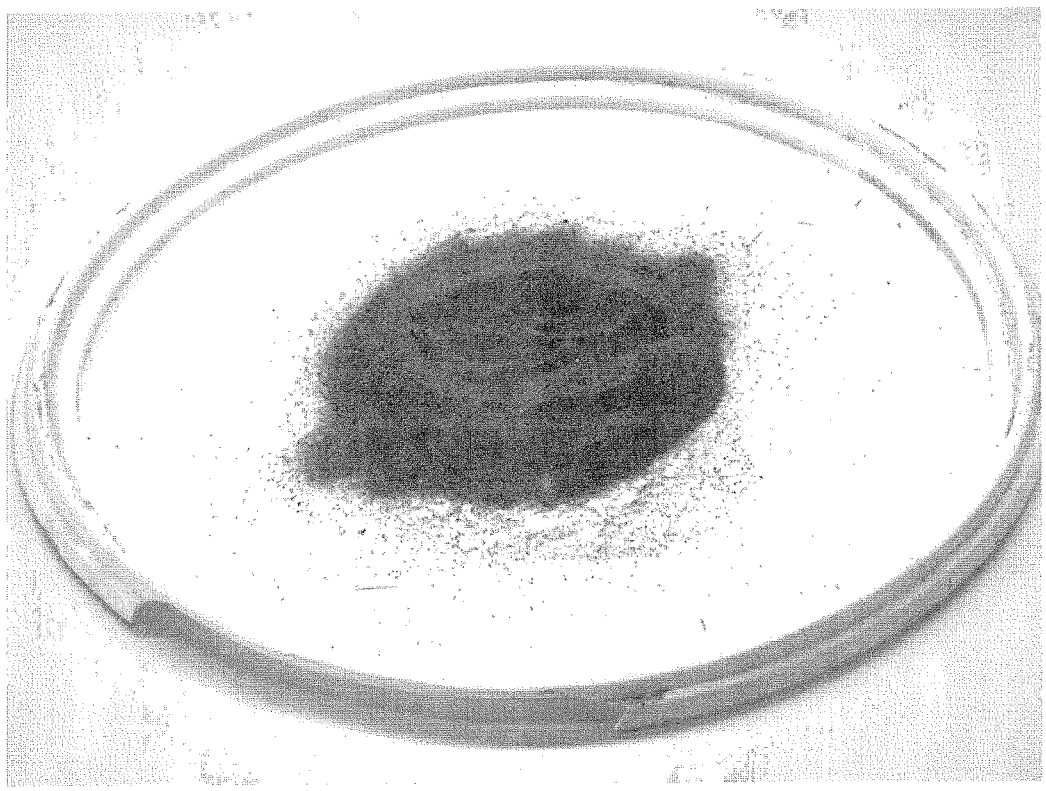
Figure 5B:
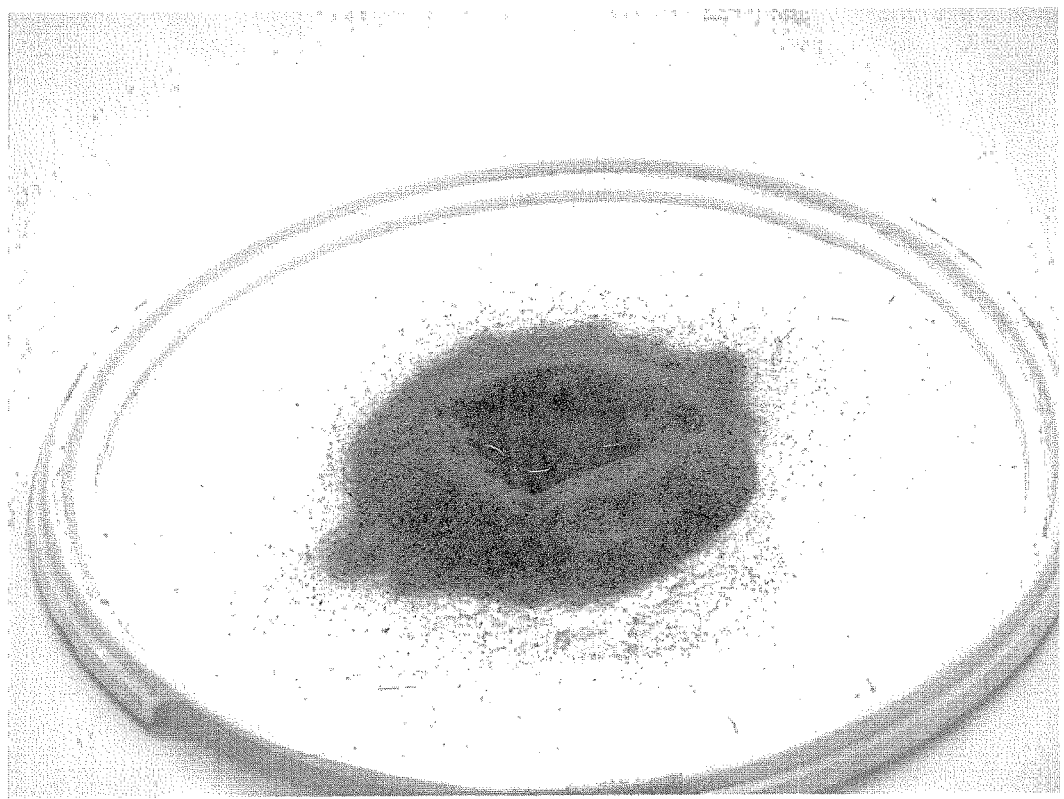
Figure 5C:

FIG. 1: Container with a water-oil mixture and a sinking nanostructured sand-oil composite according to the present invention FIG. 2: Container with a water-oil mixture and a sunken nanostructured sand-oil composite according to the present invention FIG. 3: Container with a water-oil mixture and a hydrophobic nanostructured sand according to the present invention floating on the water surface and a sunken nanostructured sand-oil composite according to the present invention FIG. 4: Conventional sand (without nano) with drained water and a nanostructured sand (including nano) with water droplets according to the present invention FIGS. 5a), 5b) and 5c): A nanostructured sand according to the present invention on a glass plate (FIG. 5a); a nanostructured sand according to the present invention with motor oil (FIG. 5b); a composite made of a nanostructured sand according to the present invention and motor oil (FIG. 5c).

DETAILED DESCRIPTION OF THE INVENTION

Surprisingly, the inventors have found that a nanostructured sand according to the present invention can be used to further separate the oil-water mixture (7 to 10% oil residue in the water) formed during oil production as, when using the separation method of the present invention, the crude oil present in the water is permanently bound to the surface of the sand due to the sand's nanostructure according to the present invention. In comparison, conventional sand, i.e. sand not nanostructured according to the present invention, does not form a permanent sand-crude oil composite; as a consequence, the oil separates again from the sand and the water is thus not permanently purified. According to the present invention, a permanent sand-oil composite means that the composite does not separate at common ambient temperatures. However, the permanent sand-crude oil composite can be separated again when applying additional physical conditions such as increased pressure and/or increased temperature, and/or when adding suitable chemicals, for example adding suitable surface-active compounds, so-called surfactants, preferably environmentally friendly biodegradable surfactants.

The oil-sand composite obtained this way can be separated from the water, at least partially, according to conventional separation methods, allowing a distinct reduction of the oil residue in the water. Preferably, the oil residue is completely separated from the water. According to the present invention, this allows the water to be purified due to physical forces without using chemical substances, thus reducing the risk of environmental pollution.

This purified water according to the present invention can be reused and in particular recycled for oil production, allowing a closed water circuit and thus a reduction of the water consumption costs. In the event that the oil-sand composite is completely separated from the water, the water, depending on its original quality, can even be used as drinking water.

In addition, as due to the further purification according to the present invention no oil-water mixture has to be stored in lagoons, the risk of environmental pollution is considerably reduced.

In the event that the crude oil is separated from the oil-sand composite according to conventional methods, in particular by using excess pressure, for example by centrifugation, the amount of oil produced can also be substantially increased by using the 7 to 10% oil residue. For example, when producing approx. 168,000 barrels of crude oil per day, about 12,000 to 17,000 barrels of crude oil per day (corresponding to the 7 to 10% oil residue) can be additionally used industrially, thus considerably increasing the turnover.

In addition, the inventors have surprisingly found that the nanostructured sand according to the present invention cannot only separate crude oil but all contaminants suitable to bind to the surface of the nanostructured sand according to the present invention from a corresponding water mixture. As a consequence, the nanostructured sand according to the present invention can be used to separate one or more different suitable contaminants from a corresponding contaminant-water mixture, with the one or two, three, four or more different contaminants selected from the group consisting of greases and/or oils, preferably crude oil, motor oil; sulfur-containing compounds, for example sulfur; arsenic-containing compounds, for example arsenic; gold-containing compounds, for example gold; mercury-containing compounds, for example mercury.

According to the first embodiment of the present invention the nanostructured sand comprises one or more sand grains and is characterized in that at least part of the sand grains exhibits a surface that is at least partially structured with one or more silicon-based nanoparticles.

According to a preferred embodiment of the present invention the nanostructured sand according to the present invention can be manufactured according to the manufacturing process of the present invention in accordance with the second embodiment of the present invention, which comprises the following steps or consists thereof:
  a) providing sand comprising one or more sand grains,
  b) providing one or more silicon-based nanoparticles in a carrier liquid,
  c) mixing the sand from step a) with the one or more nanoparticles from step b) and then
  d) heating the sand-nanoparticle mixture from step c) until at least part of the sand from step a) exhibits a surface that is at least partially structured with the one or more silicon-based nanoparticles from step b).

Any commercially available sand, for example beach sand, desert sand, terrarium sand, bird sand etc. can be used as a suitable sand for step a). According to the present invention, sand to be used according to the present invention comprises sand grains in the grain size range from 0.1 mm to 10 mm, i.e. conventional sand with grain size diameters from 0.1 mm to 0.5 mm, or sand-gravel mixtures, i.e. conventional sand with grain size diameters from 0.1 mm to 0.5 mm and larger sand grains, also called gravel, with grain size diameters of >0.5 mm to 10 mm, or gravel, i.e. sand grains with a grain size diameter of >0.5 mm to 10 mm. Hydrophobic nanostructured sand according to the present invention that is for example intended to float on the water surface area preferably has a grain diameter of 0.1 mm to about 3 mm. Sand grains with a grain diameter of >3 mm will usually not float on the water surface, but sink down due to their inherent weight, independently of the hydrophobicity of the nanostructured sand according to the present invention. If such a sand according to the present invention with a grain diameter of >3 mm is used to separate a contaminant floating on the water surface, for example greases or oils, preferably crude oil or motor oil, this sand also binds to the one or more contaminants, for example greases or oils, preferably crude oil or motor oil, when applied to the one or more contaminants.

Sand to be used according to the present invention can be dry or wet. If wet sand to be used according to the present invention is used in step a) of the manufacturing process of the present invention, the amount of carrier liquid in step b) may be reduced; if appropriate, the carrier liquid can be omitted in step b).

According to a preferred embodiment the sand used in step a) is preferably dry.

According to a cumulatively or alternatively preferred embodiment of the manufacturing process of the present invention it is preferred that purely inorganic silicon-based nanoparticles be used in step b), which, in addition, preferably do not comprise any salts, in particular halides. According to a cumulatively or alternatively preferred embodiment of the manufacturing process of the present invention it is preferred that ground silicon is used as silicon-based nanoparticles in step b).

Typically, the silicon-based nanoparticles are preferably ground silicon of a particle diameter of 1 to 900 nm, preferably 5 to 500 nm, more preferably 10 to 200 nm. In a preferred embodiment the nanostructured sand according to the present invention is free of silicon and/or free of phosphate, and/or free of organic compounds, more preferably free of organic polymer compounds, even more preferably free of organic halogen-containing polymer compounds, for example Teflon.

According to another cumulatively or alternatively preferred embodiment of the manufacturing process of the present invention each conventional suitable liquid or each conventional suitable liquid mixture can be used as a carrier liquid in step b), for example water or a water mixture, organic solvents such as alcohol, acetone etc. Preferably, for ecological reasons, water or a water mixture is used as a carrier liquid. As, according to a cumulatively or alternatively preferred embodiment of the manufacturing process of the present invention, the silicon-based nanoparticles provided in step b) including the preferred embodiments do not dissolve in the carrier liquids, no residues of the sand according to the present invention are left in the water when the sand according to the present invention is separated from the water.

According to another cumulatively or alternatively preferred embodiment of the manufacturing process of the present invention step b) provides an amount of silicon-based nanoparticles, preferably ground silicon nanoparticles, or an amount of the nanoparticle-carrier liquid mixture that is sufficient to structure at least part of, preferably a large part of, the surface of the sand grains from step a) with nanoparticles.

According to step c) of the manufacturing process of the present invention any conventionally suitable mixing process can be used to mix the sand from step a) with the nanoparticles in the carrier liquid according to step b). Preferably, the sand is mixed with the nanoparticle carrier liquid in step c) of the manufacturing process of the present invention until a homogenous mixture is obtained.

The mixing process according to step c) of the manufacturing process of the present invention is usually performed at temperatures above freezing and below the boiling point of the carrier liquid, as otherwise a complete mixing of the sand and the nanoparticle carrier liquid mixture may not be guaranteed.

The mixing of the sand from step a) with the one or more nanoparticles from step b) according to process step c) of the manufacturing process of the present invention can be performed according to conventional mixing processes.

According to the present invention, the sand-nanoparticle-carrier liquid mixture from step d) is heated until at least part of the sand from step a) exhibits a surface that is at least partially structured with the one or more silicon-based nanoparticles from step b). Usually, the mixture is heated to a temperature near the boiling point of the carrier liquid or higher temperatures. For example, when using distilled water as a carrier liquid, the temperature is increased to preferably ≥70° C., preferably 80 to 200° C., more preferably 90 to 150° C. Usually, the sand-nanoparticle-carrier liquid mixture is heated until the sand is, at least partially, preferably completely, dry and exhibits, at least partially, preferably for the large part, more preferably completely, the nanostructured surface according to the present invention. At higher temperatures, the drying time of the sand is respectively shortened. The drying time can also be shortened by already heating the sand used according to step a) and/or the nanoparticles in the carrier liquid used according to step b). Preferably, the sand and/or the nanoparticles in the carrier liquid are heated to temperatures below the boiling point of the carrier liquid. For example, when using water as a carrier liquid, the sand and/or the nanoparticles in the carrier liquid are preferably heated to temperatures in the range of 30° C. to 90° C., more preferably 50° C. to 85° C., even more preferably 60° C. to 80° C. Thus, the duration of the drying process according to step d) can be considerably reduced.

In particular due to its nanostructure, the nanostructured sand according to the present invention allows an increase of the sand's surface and thus the binding to one or more different contaminants.

In a preferred embodiment the sand according to the present invention, due to its nanostructure, exhibits a surface having a water contact angle θ at room temperature of ≥90°, preferably ≥100°, more preferably ≥110°. FIG. 4 shows conventional sand (without nano) and nanostructured sand according to the present invention that are both sprinkled with water. FIG. 4 shows that the water drains in conventional sand, while in the nanostructured sand according to the present invention water droplets having a water contact angle θ at room temperature of ≥90°, preferably ≥100°, more preferably ≥110° are formed. A water contact angle θ of ≥90° suggests that the surface of the nanostructured sand is hydrophobic and the sand according to the present invention—depending on its inherent weight—is initially able to float on the water surface (see also FIGS. 1 and 3). A corresponding nanostructured sand is preferably used to separate such contaminants located on the water surface, for example greases and/or oils, preferably crude oil, motor oil; sulfur-containing compounds, for example sulfur; arsenic-containing compounds, for example arsenic; gold-containing compounds, for example gold; mercury-containing compounds, for example mercury.

The nanostructured sand according to the present invention preferably having a hydrophobic surface is preferably used not only a) to separate one or more different contaminants from a contaminant-water mixture, but, according to the present invention, can also be used b) as a water barrier layer in agriculture, c) to prevent soil erosion, d) to reclaim land in coastal areas or e) in the event of flooding, and also f) as a barrier layer for water and/or contaminants dissolved in water in landfills, g) as a water barrier layer in building construction or h) as a water barrier layer in civil engineering and/or i) as brake sand for rail vehicles.

When the hydrophobic nanostructured sand according to the present invention is used as a water barrier layer in agriculture or landscaping or horticulture, usually a layer of the sand according to the present invention is placed beneath the topsoil. By using a hydrophobic nanostructured sand layer according to the present invention, on the one hand, water is prevented from draining into the groundwater uncontrollably, and, on the other hand, the irrigation water is kept closer to the plants' root system, thus reducing the amount of water for watering. As the nanostructured sand according to the present invention, especially in an aqueous environment, is not soluble and, in particular, does not discharge any chemicals, a corresponding nanostructured sand layer can be used in particular for agricultural plants suitable for consumption. The use of nanostructured sand as a water barrier layer in agriculture or landscaping or horticulture is advantageous wherever larger amounts of water are required and/or high water costs and/or water shortage and/or high ambient temperatures and thus a high water demand occur. For example, in cotton plantations and/or desert regions water savings of up to 75% can be achieved by using a nanostructured sand layer according to the present invention beneath the topsoil.

When the hydrophobic nanostructured sand according to the present invention is used, for example, beneath erosion-prone roads etc., the sand according to the present invention, due to its hydrophobicity, reduces the penetration or permeation of water, thus reducing the risk of soil erosion.

The same applies to the use of the hydrophobic sand according to the present invention when reclaiming land in coastal areas. Again, the sand according to the present invention, due to its hydrophobicity, reduces the penetration or permeation of seawater and thus land loss.

Similarly, when using the hydrophobic sand according to the present invention to fill sandbags to be employed in the event of flooding, the penetration or permeation of water can be reduced. As a result the sandbags themselves remain substantially dry and, consequently, can be stored when filled. Thus, in the event of acute flooding, time can be saved as the already filled sandbags can be directly used.

When the hydrophobic nanostructured sand according to the present invention is used as a sand layer beneath (open) landfills, the sand according to the present invention, on the one hand, can reduce water drainage. In addition, the sand according to the present invention, due to its nanostructure, can bind to one or more contaminants possibly present in the water, thus reducing the risk of environmental pollution.

Finally, the hydrophobic nanostructured sand according to the present invention, in particular, can be used in building construction and/or civil engineering. In building construction, the hydrophobic nanostructured sand according to the present invention can be placed, for example, as a layer beneath the foundation reducing or preventing, in particular, groundwater etc. from rising into the foundation, thus increasing the foundation's durability and the life span of the building structure.

In civil engineering, the hydrophobic nanostructured sand according to the present invention can be used, for example, to cover cable ducts, tubes etc. On the one hand, these are protected against penetration of water and thus corrosion, on the other hand, repair work can be carried out at temperatures around freezing as the sand, due to its hydrophobicity, does not freeze, allowing, in particular, working hours to be reduced and/or damage to be fixed more quickly.

Another application of the hydrophobic nanostructured sand according to the present invention includes in particular rail vehicles. Rail vehicles, when braking, usually release brake sand from special sand containers onto the rails to increase friction and thus reduce the braking distance. It has been shown that conventional sand not having a nanostructure according to the present invention tends to clump in summer, in particular at high humidity, or tends to freeze in winter due to low temperatures. This may interfere with the braking action as the sand is no longer able to properly trickle off the sand containers onto the rails. To eliminate this disadvantage, the sand containers are currently being restructured such that they can be heated. This conversion is very expensive and also susceptible to interference in case the heating breaks down. As a more inexpensive and less susceptible alternative the hydrophobic nanostructured sand according to the present invention can be used as brake sand for rail vehicles, which, due to the sand's hydrophobicity, reduces the risk of clumping at high humidity and/or freezing at temperatures near freezing.

Another application of the nanostructured sand according to the present invention is its use as a barrier layer for greases and/or oils, in particular in the event of oil spills in oil pipelines both on-shore and off-shore. As shown in FIGS. 5a) to 5c), nanostructured sand according to the present invention, depending on the layer thickness used, prevents the drainage of grease and/or oils. Thus, especially in the case of oil spills, environmental pollution can be prevented by means of simple tools. When stirring/mixing the sand with the applied oil, the formation of a composite made of the nanostructured sand according to the present invention and the applied oil can be observed (FIG. 5c). On the one hand, the oil localized on the barrier layer (compare FIG. 5b) can be easily removed using suitable means. On the other hand, oil that is already bound to the surface of the sand according to the present invention due to mixing procedures (when eliminating the oil disposed on the sand according to the present invention) (compare FIG. 5c) can be easily removed. The sand-oil composite formed can be easily separated into the nanostructured sand according to the present invention and the grease or oil according to suitable separation methods (physical and/or chemical). Then, the nanostructured sand according to the present invention can be reused as a barrier layer, while the separated grease and/or oil, for example, can be recycled for industrial use.

According to the third embodiment of the present invention, the nanostructured sand according to the present invention can also be used to separate a contaminant-water mixture. A corresponding method of the present invention comprises the following steps or consists thereof:
  a) providing a contaminant-water mixture,
  b) providing nanostructured sand according to the present invention,
  c) adding the nanostructured sand from step b) to the contaminant-water mixture from step a) until at least part of the contaminants is bound to the surface of the nanostructured sand,
  d) separating at least part of the sand-contaminant composite formed in step c) from the water and,
  e) if appropriate, at least partially separating the one or more contaminants from the sand-contaminant composite.

According to step a) of the separation method of the present invention the contaminant-water mixture may comprise one or more different contaminants suitable to bind to the surface of the nanostructured sand according to the present invention. According to a preferred embodiment of the present invention the one or two, three, four or more different contaminants are selected from the group consisting of greases and/or oils, preferably crude oil, motor oil; sulfur-containing compounds, for example sulfur; arsenic-containing compounds, for example arsenic; gold-containing compounds, for example gold; mercury-containing compounds, for example mercury.

According to step b) nanostructured sand according to the present invention in accordance with the first and/or second embodiment of the present invention can be used. If one or more contaminants primarily arranged on the water surface are to be separated, the nanostructured sand according to the present invention comprises at least partially hydrophobic nanostructured sand according to the present invention, i.e. sand according to the present invention having a contact angle $\theta$ of $\geq 90°$, more preferably $\geq 100°$, even more preferably $\geq 110°$.

According to step c) the nanostructured sand according to the present invention from step b) is added to the contaminant-water mixture from step a) until at least part of the contaminants, preferably all of the contaminants, are bound to the surface of the nanostructured sand. In some embodiments of the separation method of the present invention it may be advantageous to mix the nanostructured sand according to the present invention with the contaminant-water mixture by means of suitable equipment. In other embodiments, in particular when one or more contaminants are primarily arranged on the water surface, for example in crude oil or motor oil spilled from tankers, rigs, oil pipelines, or in service water generated during oil production, additional mixing can be dispensed with by the advantageous use of hydrophobic nanostructured sand.

If the advantageously hydrophobic nanostructured sand according to the present invention is applied to the one or more contaminants, preferably greases and/or oils, preferably crude oil, motor oil, arranged on the water surface, the one or more contaminants are, at least partially, preferably completely, bound to the surface of the nanostructured sand according to the present invention. The sand-contaminant composite generated this way can sink down in the water due to its increased inherent weight. The sunken sand-contaminant composite, for example a sand-oil composite that, in addition, partially comprises sand according to the present invention the surface of which is not completely bound to a contaminant, for example oil, can be re-mixed with the contaminant, for example oil, thus binding to a larger amount of the contaminant, for example oil.

According to step d) of the separation method of the present invention at least part of the sand-contaminant mixture formed in step c) is separated from the water by means of conventional suitable techniques. For example, in the case of sand-crude oil composites corresponding sand-crude oil lumps are formed sinking to the ground or being washed ashore. Under water or ashore the corresponding sand-crude oil lumps may be retrieved by means of suitable techniques such as underwater vacuum devices etc. Thus, the crude oil can be separated from the water, either service water generated during oil production or seawater in the case of oil spills, and the remaining water has achieved its previous purity.

In an advantageous embodiment of the separation method of the present invention, in an optional step e), the one or more contaminants are at least partially separated from the sand-contaminant composite by means of suitable physical and/or chemical methods, allowing in particular the reuse of the nanostructured sand according to the present invention. Greases and/or oils, for example crude oil, motor oil etc., can also be separated from the sand-crude oil composite by using suitable physical methods (use of excess pressure and/or temperature increase etc.) and/or chemical methods (use of surfactants etc.). In particular when separating the crude oil from the service water generated during oil production, the crude oil residue obtained from the sand-crude oil composite can be recycled for oil production, thus increasing the amount of oil produced.

Below, the present invention will be described using exemplary embodiments that are to be understood merely as examples and are not intended to restrict the scope of protection of the present property right.

EXAMPLES

1. Manufacture of Nanostructured Sand According to the Present Invention

Materials:
Bird sand—from Natura Saaten GmbH—D-28295 Bremen
Terrarium sand—JBL GmbH & Co. KG—D-67141 Neuhofen—Terra Sand
Baltic Sea sand—from Ahlbeck beach
The sand grain diameters are 0.4 mm on average for the above sand materials.

For the tests, 500 grams of each of the above sand materials (bird sand, terrarium sand, Baltic Sea sand) are mixed in a suitable container, i.e. pot, with 50 ml NZB Sandshield (manufacturer: Nano Zentrum Berlin NZB GmbH, Berlin) containing the silicon-based nanoparticle to be used according to the present invention. Each mixture was stirred and heated so vigorously that the liquid evaporates at least partially, preferably completely, leaving preferably dry nanostructured sand according to the present invention.

The nanostructured sand materials according to the present invention manufactured this way were applied to water and simulated seawater (200 ml of water with half a teaspoon of table salt). It could be observed that the sand materials according to the present invention manufactured this way float on the water surface. When the sand materials according to the present invention are applied to alcohol, for example 99% alcohol, they do not float on the surface, due to their lower surface tension, but sink down.

According to the present invention, the individual features of the above embodiments can also be combined with preferred features of the general description of the invention.

2. Separation of Crude Oil from a Motor Oil-Water Mixture According to the Present Invention At room temperature, 250 ml of water and 25 ml of motor oil are placed in a glass container. The mixture is left standing until the motor oil is arranged on the water surface.

Figure 2:
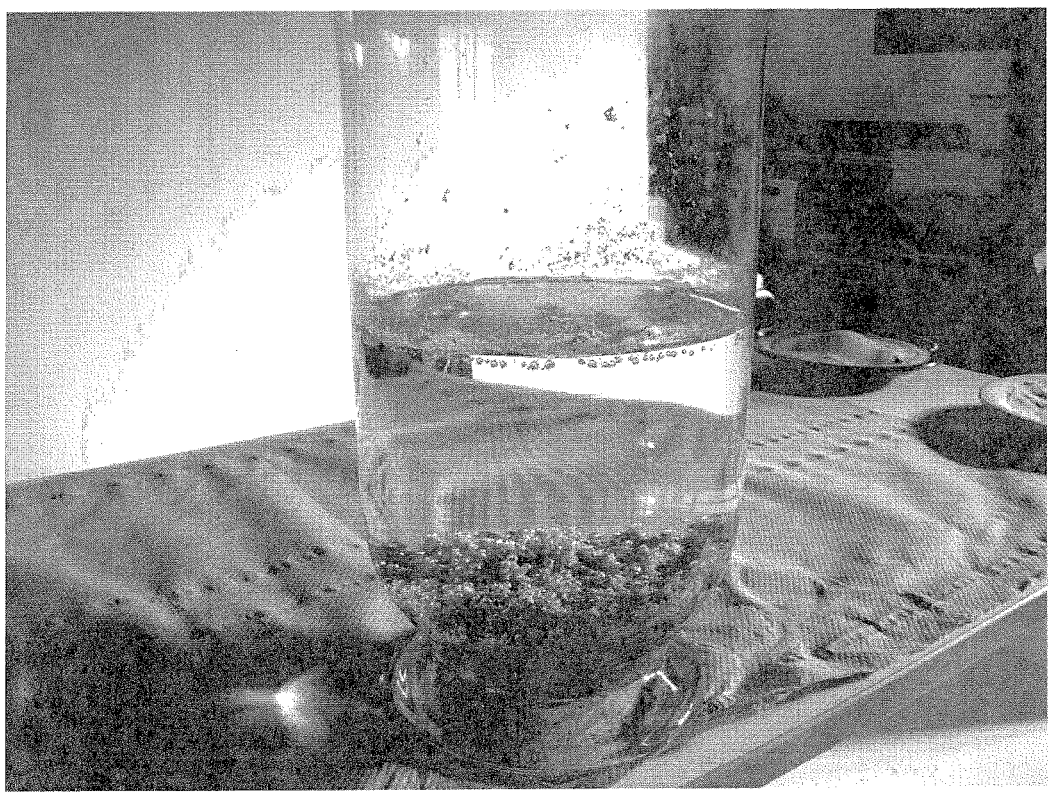

Now an amount of the nanostructured sand according to the present invention manufactured according to Example 1 is applied onto the motor oil floating on the water that is sufficient for at least part of, preferably all of the motor oil, to bind to the surface of the nanostructured sand according to the present invention. FIGS. 1 to 3 show a container comprising a corresponding water-oil mixture. The nanostructured sand according to the present invention was applied onto this water-oil mixture and, after forming the sand-oil composite at the bottom of the container, sinks down partially (FIGS. 1 and 3) or completely (FIG. 2).

If clouding is observed, the mixture should be left standing and further sand according to the present invention can be added, if appropriate.

Optionally, the mixture can be stirred to further mix the nanostructured sand according to the present invention and the motor oil.

For all three types of sand, i.e. bird sand, Baltic Sea sand and terrarium sand, a separation of the motor oil from the water and the corresponding formation of a sand-motor oil composite could be observed. Consequently, all three nanostructured sands according to the present invention are suitable to separate contaminants, in particular oils such as motor oil, from water.

The sand-motor oil composite obtained is separated from the water by decantation. The motor oil can be separated from the sand by exerting pressure, for example by centrifugation. For example, centrifuges currently used for drying sand that operate at a speed of 5 times that of the acceleration of gravity (5G) are suitable for large-scale use.

According to the present invention, the individual features of the above embodiments can also be combined with one or more preferred features of the general description of the invention.

3. Formation of a Barrier Layer for Greases and/or Oils According to the Present Invention by the Example of Motor Oil A suitable amount of nanostructured sand according to the present invention is spread onto a glass plate (compare FIG.

5a). A certain amount of motor oil was applied to it. According to FIG. 5b) it is evident that the motor oil remains on the surface of the sand layer according to the present invention and does not penetrate the sand. In other words, the nanostructured sand according to the present invention is not only hydrophobic, but also oleophobic. If the sand according to the present invention is mixed with the oil disposed thereon (for example when the unbound oil is separated), a sand-oil composite according to the present invention made of oil-coated sand balls is formed (compare FIG. 5c). This sand-oil composite according to the present invention can be subject to a separation according to the above exemplary method 2.

Consequently, the nanostructured sand according to the present invention is suitable, in particular as a barrier layer for greases and/or oils, to prevent for example the crude oil from draining into deeper layers of soil in the case of oil spills in on-shore pipelines.

The invention claimed is:

1. A nanostructured sand comprising one or more sand grains, wherein at least part of the sand grains has a diameter in the range of 0.1 mm to 10 mm and at least part of the sand grains exhibits a surface that is at least partially structured with one or more silicon-based nanoparticles, and the silicon-based nanoparticle(s) is/are composed of inorganic silicon-based nanoparticles which do not comprise any salts and have a particle diameter of 1 to 900 nm, with the proviso that the nanostructured sand is free of silicone and free of phosphate and free of organic compounds.

2. The nanostructured sand according to claim 1, wherein at room temperature, water on the surface of the nanostructured sand has a contact angle θ of ≥90°.

3. A method of manufacturing a nanostructured sand according to claim 1, comprising the steps of:
    a) providing sand comprising one or more sand grains, wherein at least part of the sand grains has a diameter in the range of 0.1 mm to 10 mm,
    b) providing one or more silicon-based nanoparticles in a carrier liquid, wherein the nanoparticles are composed of inorganic silicon-based nanoparticles which do not comprise any salts and have a particle diameter of 1 to 900 nm,
    c) mixing the sand from step a) with the one or more nanoparticles in the carrier liquid from step b) and then
    d) heating the sand-nanoparticle-carrier liquid mixture from step c) until at least part of the sand from step a) exhibits a surface that is at least partially structured with the one or more silicon-based nanoparticles from step b) with the proviso that the nanostructured sand is free of silicone and free of phosphate and free of organic compounds.

4. A method of separating a contaminant-water mixture, comprising the steps of:
    a) providing a contaminant-water mixture,
    b) providing nanostructured sand wherein at least part of the sand grains has a diameter in the range of 0.1 mm to 10 mm and at least part of the sand grains exhibits a surface that is at least partially structured with one or more silicon-based nanoparticles, and the silicon-based nanoparticle(s) is/are composed of inorganic silicon-based nanoparticles which do not comprise any salts and have a particle diameter of 1 to 900 nm, with the proviso that the nanostructured sand is free of silicon and free of phosphate and free of organic compounds,
    c) adding the nanostructured sand from step h) to the contaminant-water mixture from step a) until at least part of the contaminants is bound to the surface of the nanostructured sand, and
    d) separating at least part of the sand-contaminant composite formed in step c) from the water.

5. The use of the nanostructured sand according to claim 1:
    a) for separating the one or more different contaminants from a contaminant-water mixture,
    b) as a water barrier layer in agriculture,
    c) as a water barrier layer to prevent soil erosion,
    d) as a water barrier layer when reclaiming land in coastal areas,
    e) as a water barrier layer in the event of flooding,
    f) as a barrier layer for water and/or contaminants in landfills,
    g) as a water barrier layer in building construction,
    h) as a water barrier layer in civil engineering
    i) as brake sand for rail vehicles and/or
    j) as a barrier layer for greases and/or oils.

6. The method according to claim 4 wherein the contaminant-water mixture comprises one or more different contaminants selected from the group consisting of greases and/or oils, sulfur-containing compounds, arsenic-containing compounds, gold-containing compounds, and mercury-containing compounds.

7. The nanostructured sand according to claim 1, wherein the at least part of the sand grains has a diameter in the range of 0.5 mm to 3 mm.

8. The method according to claim 4, further comprising the step of at least partially separating the contaminant from the sand-contaminant composite.

9. The use according to claim 5, wherein the contaminant-water mixture comprises one or more different contaminants selected from the group consisting of greases and/or oils, sulfur-containing compounds, arsenic-containing compounds, gold-containing compounds, and mercury-containing compounds.

10. The method according to claim 6, wherein the one or more contaminants are selected from the group consisting of crude oil, motor oil, sulfur, arsenic, gold and mercury.

11. The use according to claim 9, wherein the contaminant-water mixture comprises one or more different contaminants selected from the group consisting of crude oil, motor oil, sulfur, arsenic, gold, and mercury.

* * * * *

UNITED STATES PATENT AND TRADEMARK OFFICE
CERTIFICATE OF CORRECTION

PATENT NO. : 10,213,764 B2
APPLICATION NO. : 15/121740
DATED : February 26, 2019
INVENTOR(S) : Juergen Schneider Page 1 of 1

It is certified that error appears in the above-identified patent and that said Letters Patent is hereby corrected as shown below:

In the Claims

Claim 4, Column 12, Line 8 "sand from step h)" should be --sand from step b)--

Signed and Sealed this
Eleventh Day of June, 2019

Andrei Iancu
*Director of the United States Patent and Trademark Office*